United States Patent [19]
Wintzer et al.

[11] 4,340,962
[45] Jul. 20, 1982

[54] CIRCUIT ARRANGEMENT FOR THE SYNCHRONIZATION OF A DIGITAL SUBSCRIBER STATION BY A DIGITAL EXCHANGE IN A PCM TELECOMMUNICATION NETWORK

[75] Inventors: Klaus Wintzer; Josef Zemanek; Frithjof von Sichart, all of Munich, Fed. Rep. of Germany

[73] Assignee: Siemens Aktiengesellshaft, Berlin and Munich, Fed. Rep. of Germany

[21] Appl. No.: 166,474

[22] Filed: Jul. 7, 1980

[30] Foreign Application Priority Data

Jul. 27, 1979 [DE] Fed. Rep. of Germany ....... 2930586

[51] Int. Cl.³ .......................... H04J 3/06; H04L 7/10
[52] U.S. Cl. ..................................... 370/100; 375/116
[58] Field of Search ................ 370/100, 105, 106, 29; 375/116

[56] References Cited

U.S. PATENT DOCUMENTS

| | | | |
|---|---|---|---|
| 3,127,475 | 3/1964 | Coulter | 370/100 |
| 3,537,069 | 10/1970 | Van de Houten | 370/100 |
| 3,662,114 | 5/1972 | Clark | 370/105 |
| 3,920,900 | 11/1975 | Fineman | 370/100 |

FOREIGN PATENT DOCUMENTS

| | | |
|---|---|---|
| 9586 | 8/1979 | European Pat. Off. . |
| 2835605 | 2/1980 | Fed. Rep. of Germany . |
| 2841855 | 4/1980 | Fed. Rep. of Germany . |
| 2842371 | 4/1980 | Fed. Rep. of Germany . |

*Primary Examiner*—Douglas W. Olms
*Attorney, Agent, or Firm*—Spellman, Joel & Pelton

[57] ABSTRACT

Circuit arrangement for synchronizing a subordinate system, in particular a digital subscriber station, by a superordinate system, in particular a digital exchange, in a PCM time-multiplex telecommunication network. The circuit arrangement operates to evaluate only those synchronization bit combinations which lie at the beginning of a message signal block, thereby avoiding initiation of a re-synchronization during transmission of a block.

4 Claims, 1 Drawing Figure

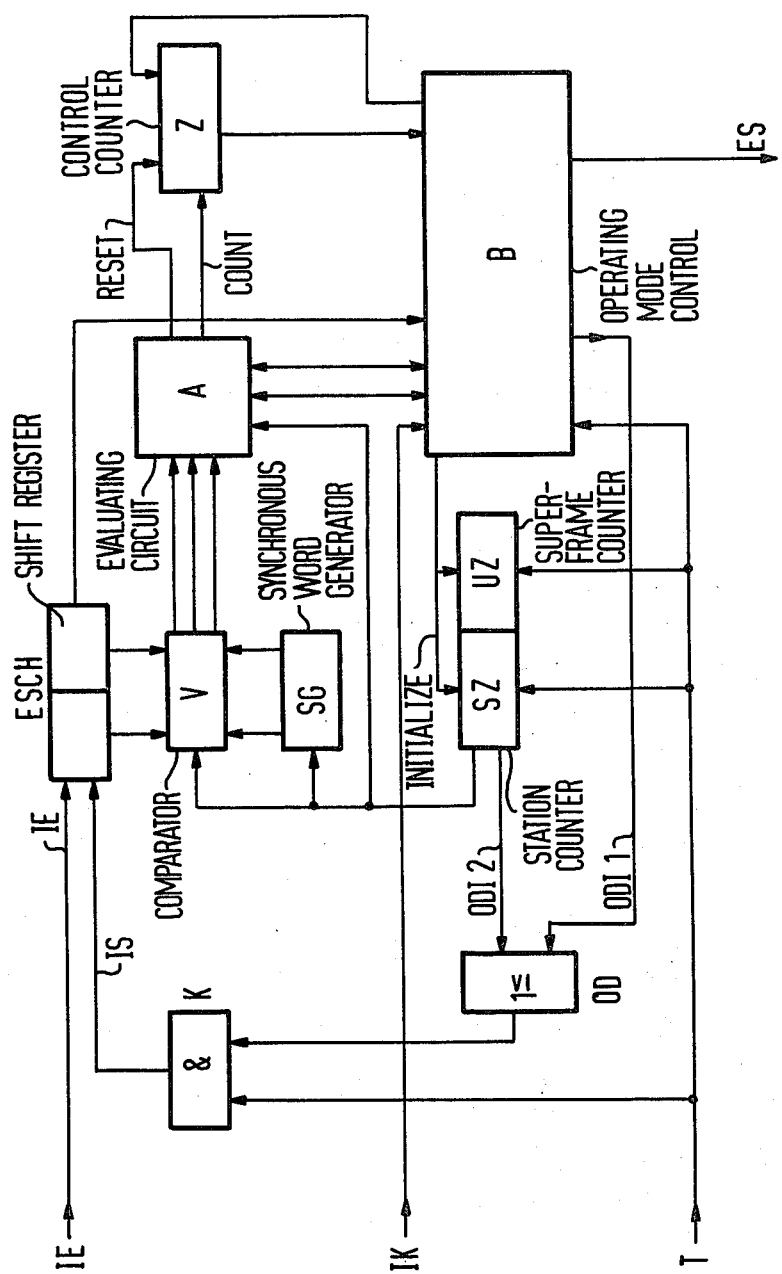

CIRCUIT ARRANGEMENT FOR THE SYNCHRONIZATION OF A DIGITAL SUBSCRIBER STATION BY A DIGITAL EXCHANGE IN A PCM TELECOMMUNICATION NETWORK

BACKGROUND OF THE INVENTION

The invention relates to a circuit arrangement for the synchronization of a subordinate system, in particular a digital subscriber station, by a superordinate system, in particular a digital exchange in a pulse code modulated (PCM) telecommunication network.

Digital signals are transmitted in a PCM telecommunication network in the form of message signal blocks which comprise: (1) a prefixed synchronization word whose first bit always keeps the same value but which indicates, by changing bit combinations, at least the beginning of a superframe containing several receive/transmit periods of such message signal blocks; (2) in some cases, a plurality of bits for signalling or control; and (3) at least one message signal word. The beginning of a message signal block is identified by evaluating those bit combinations resembling a synchronization word which occur simultaneously with a "criterion" constituting an enabling time window and indicated by a separate signal. The first bit of a synchronization word is identified as the start of the message signal block.

The mentioned "criterion" ensures that message signal bit combinations, which resemble but do not constitute synchronization words and which usually occur from time to time over protracted time periods, do not lead to erroneous synchronizations. If the digital message signals of the message signal blocks are represented during transmission by signal values which can be distinguished from the signal states prevailing during the intervals between transmissions, such a criterion can be derived at the receiving end from the message signal blocks themselves by generating a receive control signal which marks the time position of the message signal block and also indicates its length. This technique is disclosed in the West German patent application No. P 28 35 605.

If, however, as is often the case the so-called AMI code (alternate mark inversion code) is used for message signal bit representation in which the "1" binary values are indicated by alternate pulses of positive and negative voltage and the "0" binary values are indicated by a zero voltage, it is not possible to produce such a receive control signal.

It has therefore been proposed to clear the synchronization system during the synchronization phase to permit an immediate resynchronization only after a counter, set to its initial position by each received bit of that binary value which the first bit of a synchronization word must have, and advanced by the transmit/receive clock, has reached a position or count corresponding to a total number of bit time periods which is greater than the time span during which bits of the other binary value can occur successively in a message signal block. After this count is reached, continued counting is prevented. For example, with the so-called HD3 code, it is ensured that no more than three bits of the binary value "0" occur successively in a message signal. If, therefore, in the proposed method the designated counter position of the counter corresponds to a time span that is greater than the sum of three bit time periods, the counter, which had been set to its initial position by a "1" bit of a message signal block, will not be able to reach this counter position for the duration of this message block because it will be reset again and again. The final counter position will instead by reached only in the interval between the reception of two message signal blocks so that, assuming absence of disturbances within such an interval, a resynchronization can actually take place only due to the occurrence of a synchronization word at the beginning of the next following message signal block. By clearing the synchronization system only at a counter position which corresponds to a time span lasting almost as long as the interval between the reception of two message signal blocks, it is ensured that any disturbances that might occur during this interval cannot lead to a false resynchronization.

In the above-mentioned mode of operation the first bit of the synchronization word sent at the beginning of the block has always the same binary value, but a second bit and possibly additional bits change their binary value after one or more transmission periods, depending on the particular situation. A superframe, comprising in the simplest case two transmission periods, is identified in this way thereby making it possible to join together in such message signal blocks any signalling bits into signalling words in addition to the actual message signal words.

It is an object of the present invention, in view of the described requirements, to provide a synchronization circuit by means of which message signal block starts, and hence correct synchronization words, can be reliably recognized. It is a further object to provide such a circuit wherein at least the beginnings of the superframes are detectable, where synchronization is achieved within the shortest possible synchronization time, and in which single disturbances remain largely ineffective. The circuit must neither effect a resynchronization during the synchronization phase due to such disturbances nor initiate a new searching process for a synchronization word during the phase of synchronous operation.

SUMMARY OF THE INVENTION

The above noted objects, as well as other objects which will become apparent from the discussion that follows, are achieved, according to the present invention, by providing a circuit arrangement, disposed in the subordinate system, which includes a shift register, an operating mode control, a station counter, a superframe counter, a synchronous word generator, a comparator, an evaluating circuit and a control counter connected to operate as follows:

The shift register comprises several stages, at least equal in number to the number of bits of a synchronization word. The shift register also has a system input, connected to the first stage, for receiving the message signal blocks in serial form. The operating mode control is connected to the stages of the shift register that contain the bits of a synchronization word received during a synchronization phase. The operating mode control evaluates these bits in response to the receipt of a criterion signal indicating the start of a message signal block. The station counter is connected to receive block pulses at a first input and to receive first reset pulses from the operating mode control at a second input. The station counter determines the transmit and receive periods of the subordinate system. Each of the first reset pulses produced by the operating mode control resets the station counter to its initial position when the bit contained in the last stage of shift register has the same binary value as the first bit of a correct synchronization word. The superframe counter is connected to receive the clock pulses at a first input and to receive the second reset pulses from the operating mode control at a second input. This superframe counter determines the superframe period of the subordinate system. Each of the second reset pulses produced by the operating mode control reset the superframe counter to a prescribed position when the bit combination of the synchronization word indicates a superframe. The synchronous word generator is connected to the superframe counter, and possibly also to the station counter, and provides a bit sample designating the superframe period, and possibly also the individual transmission period, of the subordinate system in response to signals from the superframe counter and possible station counter, respectively. The comparator, which is connected to the stages of the shift register associated with the bits of the synchronization word, to the synchronous word generator and to the station counter, compares the contents of the shift register stages and the synchronous word generator during the synchronous operation phase of the circuit arrangement when the station counter signals the first two bit time spans of each receive period. The evaluating circuit is connected to the output of the comparator and produces, during the synchronization phase, first result signals when the comparator indicates a positive comparison result and second result signals when the comparator indicates a negative comparison result. The evaluating circuit also produces, during the synchronous operation phase, third result signals when the comparator indicates a negative comparison result. Finally, the control counter is connected to the evaluating circuit and to the operating mode control. The control counter counts forward upon receipt of the first and third result signals, and is reset to zero upon receipt of the second result signals. The control counter supplies a first signal to the operating mode control upon reaching a prescribed counter position during the synchronization phase. When this occurs, the operating mode control initiates the synchronous operation phase. The control counter is also set back one count during the synchronous operation phase after a given number of transmission periods, if it is not already in its initial position. This control counter then supplies a second signal to the operating mode control upon reaching a prescribed counter position during the synchronous operation phase. When this occurs, the operating mode control again initiates the synchronization phase and suppresses the transmission and reception of information by the other parts of the subordinate system until the next synchronous phase begins.

With the circuit arrangement according to the invention, therefore, it is ensured, on the one hand, that message signal bits in the bit combinations of a correct synchronization word can be evaluated only when they occur at the beginning of a message signal block. It is further ensured that the transition from the synchronization phase, in which the testing for such a bit combination occurs independently of the position of the station counter and of the superframe counter in the subordinate system, takes place only after a correct synchronization word has been received at the beginning of several successive receive periods. And finally it is ensured that a disturbance of the synchronization word during the synchronous operation phase causes a transition to a synchronization phase only after it has been repeated several times within a given number of transmission periods.

For a full understanding of the present invention, reference should now be made to the following detailed description of one preferred embodiment of the invention and to the accompanying drawing.

BRIEF DESCRIPTION OF THE DRAWINGS

The single FIGURE shows the synchronization circuit as well as some further components of a subordinate system such as a digital subscriber station. This subordinate system receives message signal blocks of the above mentioned type from a superordinate system, such as a digital exchange, and must be resynchronized to the time conditions of the superordinate system.

DESCRIPTION OF THE PREFERRED EMBODIMENT

A subordinate system according to the invention has a synchronization circuit, shown in the FIGURE, which receives digital message signal blocks from the superordinate system. The synchronization circuit includes a receiving shift register ESCH, connected to receive the message signal blocks at the serial input IE. On the assumption that the synchronization words comprise two bits, the shift register ESCH has two stages as shown. During the synchronization phase, in which a correct synchronization word is searched for, received bits of the message signal blocks are passed via the shift register to an operating mode control B. This mode control also receives a signal, via the input IK, representing the above-mentioned "criterion;" that is, an indication as to whether a received bit or a bit combination forms the beginning of a message signal block. Only if this criterion exists, are the bits reaching the operating mode control evaluated as to whether one bit has the same binary value as the first bit of a correct synchronization word or whether their bit combination represents a correct synchronization word. In practice, the first bit of a correct synchronization word normally has the binary value 1 and the word comprises a superframe with four transmit/receive periods whose beginning (first period) is marked by the bit combination 1 1 and whose other three periods are marked by the bit combination 1 0.

If, therefore, the first of the bits taken from the receiving shift register ESCH has the binary value 1, the station counter SZ, which determines the transmission periods within the subordinate system, is in any event set to its initial position. If also the second bit has the binary value 1, then also a superframe counter UZ, which determines the superframe periods, is set to its initial position. In cases where a superframe comprises only two transmission periods or where the synchronization word comprises as many bits as are necessary to mark each transmission period within the superframe separately while maintaining always the same binary value for the first bit, and where the superframe counter UZ possesses the respective setting possibilities, this counter may be set directly to the counter position which corresponds to the received bit combination.

In any event, the setting of the station counter SZ has the result that the passage of data through the receiving shift register ESCH according to the shift clock pulses supplied at the input T now takes place only during the receive periods. Initially, the shift input IS for the shift register ESCH, which is produced by combining the clock signal at the input T with the output of an OR-gate OD in an AND-gate K, was independent of the counter position of the station counter as long as the operating mode control B supplied an input signal to the OR gate on line ODI1. After this input signal from the operating mode control B has terminated, the shift clock pulses are supplied to the shift register ESCH only when the station counter supplies an input signal to the OR-gate on line ODI2, which in this case is as long as the synchronous word lasts.*)

*) A comparator V compares the bits contained in said stages of the shift register E with the bits produced by a synchronous word generator SG.

If, during the evaluation by the operating mode control B, the binary value 1 is detected for two bits—that is, if the station counter SZ as well as the superframe counter UZ are reset to their initial positions—then the comparator V produces a positive comparison result during the next comparison cycle. Otherwise the comparator continues to supply a negative comparison result until the bit combination 1 1 is finally received and detected.

An evaluating circuit A and a control counter Z, which are further components of the synchronization circuit, determine whether a positive comparison result is produced in several, e.g. three, successive receive periods. To achieve this function, the evaluating circuit A transfers signals delivered by the comparator V in the case of a positive comparison result as counting pulses, and transfers signals supplied in case of a negative comparison result as reset pulses, to the control counter Z. The latter, therefore, can reach its given, final counter position only after a repeated uninterrupted succession of positive comparison results, upon which it delivers a signal to the operating mode control B. When such a signal is received, the operating mode control brings about the transition from the described synchronization phase to the synchronous operation phase. In this latter phase the operating mode control supplies an output signal ES which enables the reception and the sending of message signal blocks by the other parts of the subordinate system intended for that purpose, which had heretofore been suppressed.

When in the synchronous operation phase, the operating mode control B influences the evaluation in the following manner: The mode control transfers negative comparison results delivered by the comparator V via the evaluating circuit A as counting pulses to the counter Z. After a certain number of transmission periods in the course of this synchronous operation phase, this counter will be set back by one counter position, if it has left its initial position. If the counter nevertheless reaches its given final counter position, e.g. again the third counter position, it then again supplies a signal to the operating mode control which causes a transition from the synchronous operation phase to the synchronization phase. This operation of counter Z ensures that disturbances of the synchronization word which do not total up to the given threshold within the given time span do not initiate a resynchronization.

There has thus been shown and described a novel circuit arrangement for the synchronization of a digital subscriber station by a digital exchange of a PCM telecommunication network which fulfills all the objects and advantageous sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A circuit arrangement for the synchronization of a subordinate system, such as a digital subscriber station, by a superordinate system, such as a digital exchange, in a PCM telecommunication network for the transmission of digital signals in the form of message signal blocks which comprise:

(1) a prefix synchronization word having a first bit whose value remains the same and at least one subsequent bit indicative at least of the beginning of a superframe containing several receive/transmit periods within such message signal blocks, and (2) at least one message signal word having a plurality of bits, said circuit arrangement being disposed in said subordinate system and comprising, in combination:

(a) a shift register (ESCH) having a plurality of stages at least equal in number to the number of bits of a synchronization word and having an input connected to the first stage for receiving said message signal blocks in serial form;

(b) station counter means (SZ), connected to receive clock pulses at a first input and to receive first reset pulses at a second input, for producing a first output signal indicating the transmit and receive periods of said subordinate system;

(c) superframe counter means (UZ), connected to receive said clock pulses at a first input and to receive second reset pulses at a second input, for producing a second output signal indicating the superframe periods of said subordinate system;

(d) a synchronous word generator (SG), connected to said superframe counter means for providing a bit pattern of an expected synchronization word, said bit pattern being selected to indicate the beginning of a superframe period of said subordinate system in response to said second output signal from said superframe counter means;

(e) comparator means (V) connected to the stages of said shift register associated with the bits of said synchronization word, to said synchronous word generator and to said station counter means, for comparing the contents of said shift register stages and said synchronous word generator when said first output signal from said station counter means signals the beginning of each receive period;

(f) operating mode control means (B), connected to receive signals from said shift register representing the bits of a synchronization word and connected to receive a signal representing a criterion which identifies the first bit of the bit combinations received by said shift register as being the start of a message signal block, for producing (1) a mode signal (ES) indicative of a synchronization phase when in one mode and a synchronous operation phase when in another mode, (2) said first reset pulse when the bit contained in the last stage of said shift register has the same binary value as the first bit of a correct synchronization word and (3) said second reset pulse when said bit combination of said synchronization word identifies a superframe;

(g) an evaluating circuit (A), connected to the output of said comparator means and to said operating mode control means for producing during said synchronization phase first result signals when said comparator means indicates a positive comparison result and second result signals when said comparator means indicates a negative comparison result, and producing during said synchronous operation phase third result signals when said comparator means indicates a negative comparison result; and (h) a control counter (Z), connected to said evaluating circuit and to said operating mode control means, for counting forward upon receipt of said first and third result signals and resetting to zero upon receipt of said second result signals, said control counter supplying a first signal to said operating mode control means upon reaching a prescribed counter position during said synchronization phase, whereupon said operating mode control means switches to said synchronous operation phase, said control counter being set back one count during said synchronous operation phase after a given number of transmission periods if it is not already in its initial position and said control counter supplying a second signal to said operating mode control means upon reaching a prescribed counter position during said synchronous operation phase whereupon said operating mode control means switches again to said synchronization phase;

whereby the transmission and reception of information by other parts of said subordinate system is suppressed during the synchronization phase until the next synchronous phase begins.

2. The circuit arrangement defined in claim 1, wherein said message signal blocks further comprise at least one signalling bit.

3. The circuit arrangement defined in claim 1, wherein said synchronous word generator provides bit samples designating the individual transmission periods within said superframe, in addition to said bit samples designating said superframe periods, in response to said first output signal from said station counter.

4. The circuit arrangement defined in claim 1, wherein the contents of said station counter and said superframe counter remain independent from the comparison results of said comparator means during said synchronous operation phase.

* * * * *